United States Patent [19]

Cummings, III

[11] 3,848,622

[45] Nov. 19, 1974

[54] TEMPERATURE MODULATED PRESSURE REGULATING VALVE

[75] Inventor: Gordon F. Cummings, III, Rockford, Ill.

[73] Assignee: Borg-Warner Corporation, Chicago, Ill.

[22] Filed: Sept. 14, 1973

[21] Appl. No.: 397,491

Related U.S. Application Data

[62] Division of Ser. No. 307,883, Nov. 20, 1972, Pat. No. 3,804,217.

[52] U.S. Cl. .................. 137/468, 236/86, 192/82 T
[51] Int. Cl. ................... F16k 17/38, G05d 23/00
[58] Field of Search .......... 137/468; 236/86, 39, 54

[56] References Cited
UNITED STATES PATENTS

| | | | |
|---|---|---|---|
| 3,135,495 | 6/1964 | Ferris | 236/86 X |
| 3,313,485 | 4/1967 | Harvey | 236/86 |
| 3,436,017 | 4/1969 | Elmer | 137/468 X |
| 3,562,784 | 2/1971 | Lipscombe | 236/86 X |

Primary Examiner—Samuel Scott
Assistant Examiner—Lance W. Chandler
Attorney, Agent, or Firm—Herman E. Smith

[57] ABSTRACT

A temperature modulated variable speed drive includes a wet type friction clutch designed for operation in the slip range between full engagement and full release. Output speed is controlled by regulating the net engaging force applied to the friction members of the clutch. The net engaging force results from a temperature regulated air pressure acting in opposition to a preloaded spring in the engaging mechanism.

1 Claim, 4 Drawing Figures

TEMPERATURE MODULATED PRESSURE REGULATING VALVE

This is a division, of application Ser. No. 307,883 filed Nov. 20, 1972, now U.S. Pat. No. 3,804,217.

BACKGROUND OF THE INVENTION

1. Field of the Invention

The present invention relates generally to means for controlling a mechanism adapted to dissipate heat from a prime mover and more particularly to a variable speed fan drive including a slippable friction clutch in which the output speed is related to a monitored temperature associated with the prime mover.

2. Prior Art

The problem of controlling heat dissipation devices in connection with a prime mover so as to keep the prime mover at proper operating temperature while at the same time minimizing horsepower losses due to the heat dissipation devices has received attention for a number of years and has resulted in various attempted solutions.

One prior approach has been the use of thermally controlled shutters associated with a heat exchanger arranged to open and close for controlling the flow of air as the temperature exceeds or falls below a desired temperature. This approach is less than ideal in that the temperature range of the prime mover may fluctuate widely and in that an induction fan continues to operate when not needed, therefore creating unnecessary noise and consuming power which would otherwise be available for useful work.

Another well known prior approach has been the use of speed sensitive viscous fan drives in which a viscous fluid coupling medium undergoes shear to permit a difference between input and output speeds at higher input speeds. In practice such devices have generally been limited to applications such as passenger motor vehicles. A disadvantage of viscous drive is that while some models will lock-up and drive direct, they do not become fully free wheeling when released. Secondly, the viscous fluid has a tendency to deteriorate under high temperatures.

A further prior approach has been the use of a variable speed fan drive of the type in which a slippable friction clutch is permitted to slip as a function of temperature. In this latter approach, difficulty has been encountered in achieving a fan speed which is closely related to the temperature in the prime mover. In one prior device a portion of the coolant is circulated to the drive for monitoring, however, it has been found that the circulated sample of coolant does not necessarily reflect the temperature in the engine since its temperature may be changed as a result of contact with portions of the vehicle which act as a heat sink. Other problems encountered in the application of friction devices to fan drives appear to arise from shock loads created by suddenly engaging or disengaging clutches.

SUMMARY OF THE INVENTION

The present invention is concerned generally with the provision of an improved stepless variable speed drive, and more particularly with a temperature modulated drive suitable for driving a cooling fan of a prime mover, the fan speed being varied with variations in a temperature condition in the prime mover.

Among the objectives of the present invention are to provide a stepless variable speed drive having a normally engaged slippable friction clutch subject to a regulated reduction of engaging force for controlling slip thereof; to provide a slippable friction clutch in which changes in the coefficient of friction acting between friction surfaces thereof is minimized; to provide a slippable friction clutch having wet type friction facings including means for circulating a lubricating fluid in contact therewith; to provide a slippable friction clutch in which friction and inertia losses in the engaging mechanism are minimized; to provide a stepless variable speed drive in which the output speed is related to a remotely sensed temperature condition; to provide a regulated stepless variable speed drive controlled by regulated air pressure for minimizing fluid friction losses; and to provide a pneumatic control for a regulated stepless variable speed transmission including a pressure regulator capable of supplying a pneumatic static pressure head regulated in accordance with a temperature condition

BRIEF DESCRIPTION OF THE DRAWINGS

FIG. 3 is a section view, to enlarged scale, of the temperature regulated pneumatic pressure control valve shown in FIG. 2; and FIG. 4 is a fragmentary section view taken along the line 4—4 of FIG. 2 illustrating impact ladling means for circulating a clutch lubricating fluid.

DESCRIPTION OF THE PREFERRED EMBODIMENT

Figure 1:
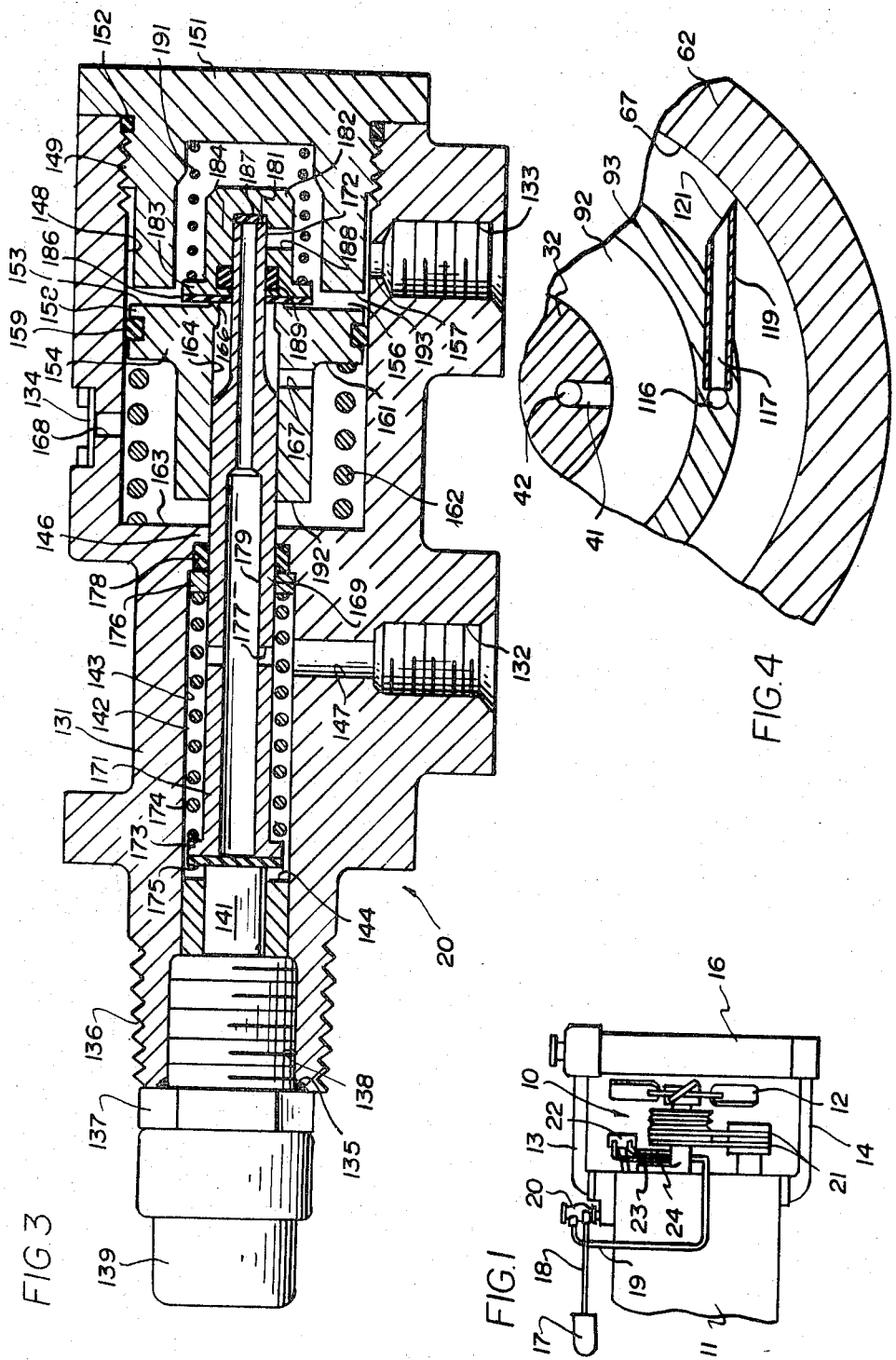
FIG. 1 is a fragmentary schematic sketch illustrating a power plant and cooling system having a variable speed fan drive mounted thereon.

Referring now in more detail to the drawings and particularly to FIG. 1 thereof, a stepless variable speed accessory drive 10 is shown mounted on a prime mover 11. A fan 12 is connected to the drive 10 for circulating a current of air about portions of a cooling system indicated by reference characters 13, 14 and 16. A source of pneumatic pressure 17 associated with the prime mover is connected by means of tubing 18 to a temperature regulated pneumatic pressure control valve 20 mounted to monitor a temperature in a portion 13 of the cooling system. The temperature regulating valve 20 is connected to the drive 10 by means of tubing 19. The drive 10 is powered from the prime mover by means of V-belts 21. If desired, a heat exchanger 22 for a clutch lubricating fluid may be mounted adjacent the drive and connected thereto by tubing 23, 24.

Figure 2:
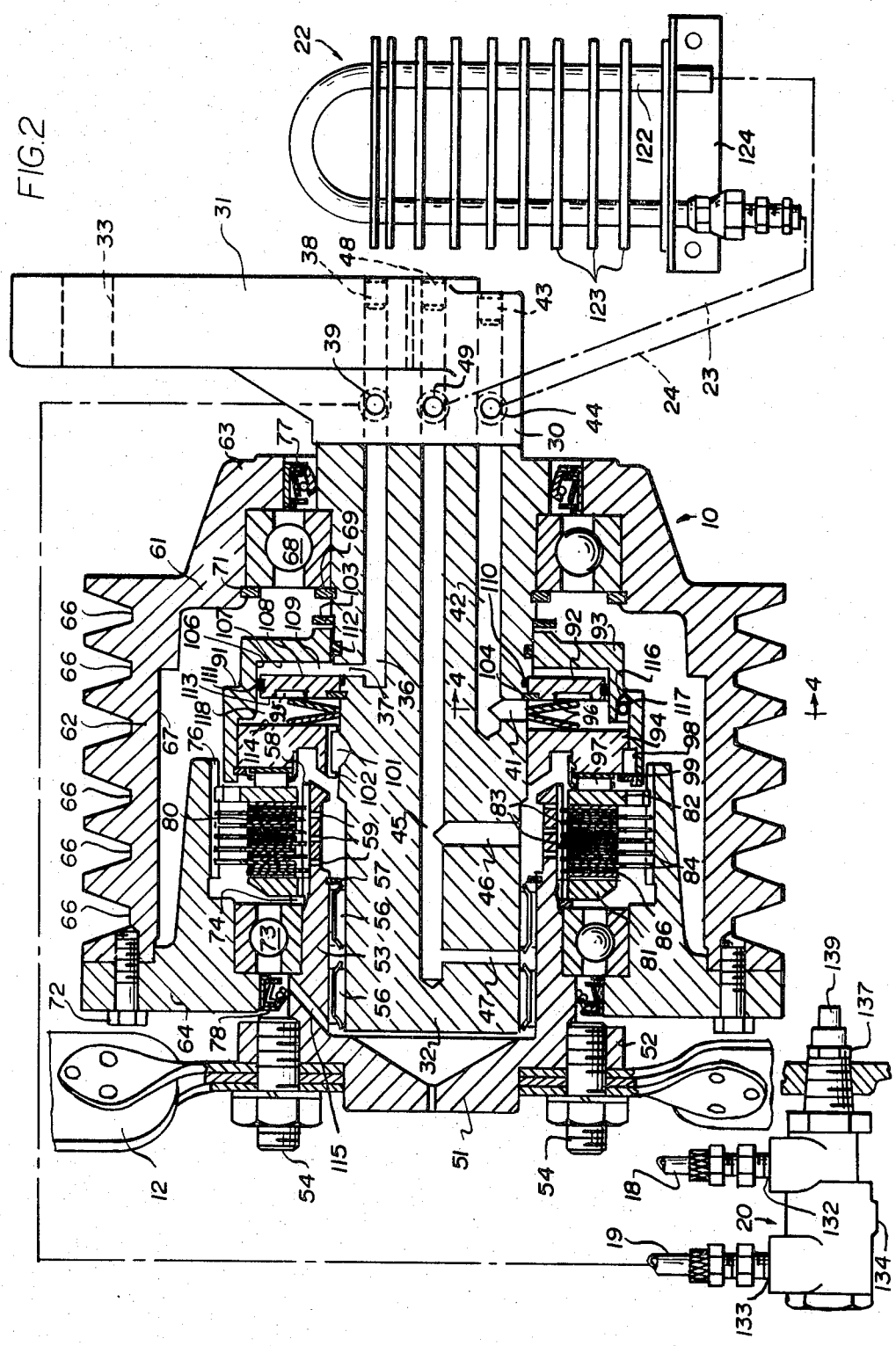
FIG. 2 is a section view of a temperature modulated variable speed fan drive showing connection to a thermally regulated pneumatic control valve and to a heat exchanger.

Referring now to FIG. 2, the drive 10 will be described in more detail. A non-rotatable mounting member 30, includes a bracket portion 31 having a non-rotatable shaft portion 32 extending therefrom. Bracket portion 31 includes apertures 33 through which mounting screws extend for securing the drive to a frame member. A control passage 36, 37 is formed in the mounting member. The end of passage portion 36 in bracket portion 31 is closed by a plug 38. A port 39 intersects passage 36 providing means for connecting the control passage to tubing 19 extending from valve 20. A lubricating fluid outlet passage 41, 42 is formed in the mounting member 30, having a plug 43 closing one end thereof and including a port 44 for connection to tubing 24. An inlet lubricating passage 45, 46, 47 is formed in mounting member 30, having a plug 48 closing one end thereof and including a port 49 for connection to tubing 23 extending from heat exchanger 22. In part, the tubing and tubing fittings are indicated by lines extending between ports. A rotatable output member 51 includes a flange portion 52 and a sleeve portion 53. Flange portion 52 includes a number of threaded studs 54 for securing a fan 12 thereto. Sleeve portion 53 is rotatably mounted on shaft portion 32 by means of roller bearings 56, 56. The roller bearings are axially secured to the sleeve by means of a retainer ring 57. Sleeve portion 53 includes a splined portion 58 for connection to portions of a friction clutch. Lubricating apertures 59 are formed in the splined portion 58 for permitting flow of lubricating fluid from passages 45, 46 to the friction members of the clutch.

Rotatable input member 61 is formed with a cylindrical outer portion 62, a radial portion 63, and an end member 64. The outer surface of cylindrical portion 62 is provided with a suitable number of grooves 66 for receiving V-belts. The inner surface 67 of cylindrical portion 62 is formed to define an annular lubricant retaining portion of the input member. An antifriction bearing 68 is secured to shaft portion 32 by a retaining ring 69 and to radial portion 63 of input member 61 by retaining ring 71, thus rotatably mounting one end of the input member on the mounting member 30. End member 64 is secured to cylindrical portion 62 by means of cap screws 72, and mounted on anti-friction bearing 73 which in turn is mounted on sleeve portion 53 of output member 51. The bearing is axially secured to sleeve 53 by retainer ring 74. End member 64 includes a splined portion 76 for connection to portions of a friction clutch. A pair of lubricant seals 77, 78 are mounted adjacent bearings 68 and 73 such that input member 61 forms a fluid enclosure.

A friction clutch 80 provides a slippable frictional coupling between input member 61 and output member 51. Clutch 80 includes a backing plate 81 secured to splined portion 58 of output member 51, a pressure plate 82 secured to splined portion 76 of input member 61, and a pack of friction discs 83, 84. Friction discs 83 are connected to splined portion 58 of output member 51, and alternate discs 84 are connected to splined portion 76 of input member 61. One group of the discs 83 or 84 is provided with a wet type friction facing material 86 which is selected in combination with a lubricating fluid to provide a predetermined coefficient of friction. Preferably the coefficient of friction should remain substantially constant in the slip range between full release and full lock up of the clutch.

An annular load cell 91 for applying an engaging force to clutch 80 is mounted on shaft portion 32. Load cell 91 includes an annular reaction member 92, a shell member 93, an apply member 94, and a pair of belleville spring members 96, 96. A thrust bearing 97 is mounted on a face of apply member 94 in engagement with pressure plate 82 of clutch 80. Apply member 94 is secured to shell member 93 by means of a pin 98 and retainer ring 99. The apply member is non-rotatably mounted on shaft portion 32 by means of a key 101 and key slot 102 permitting limited axial movement of the load cell. A retainer ring 103 on shaft portion 32 forms a stop for limiting axial movement of load cell 91 away from clutch 80 when the clutch is fully released. Reaction member 92 is secured against axial movement with respect to shaft portion 32 by means of retainer ring 104 and a shoulder of shaft portion 32. The interior surfaces 106, 107 of shell 93 and one face 108 of reaction member 92 form a control chamber 109 communicating with portion 37 of control passage 36. Seal rings 111 and 112 engage surfaces of shell 93 and seal ring 110 engages an inner surface of reaction member 92 to prevent leakage from control chamber 109. The belleville springs 96, 96 are preloaded between the face 113 of reaction member 92 and the face 114 of apply member 94 to exert a predetermined maximum engaging force on the clutch 80 through thrust bearing 97. Depressions 95 in the face 113 of reaction member 92 permit fluid flow across an edge of spring 96. A control pressure in control chamber 109 acts in opposition to springs 96, 96 reducing the engaging force on clutch 80. It should be observed that although load cell 91 is capable of axial movement, its operation does not require axial movement since the net engaging force on the clutch results from the preloaded spring 96, 96 and a control pressure acting in chamber 109. The above described construction of load cell 91 is particularly desirable because the control fluid pressure is not required to overcome the friction and inertia of moving parts, and is not required to react against a different portion of the load-deflection rate of the spring. During normal operation within the slip range, the springs 96, 96 remain in substantially the same deflected condition, and the shell 93 remains in substantially the same axial position, however, it is contemplated that the load cell 91 can be moved axially against stop ring 103 for completely disengaging clutch 80.

Another feature of load cell 91 is indicated along the section line 4—4 of FIG. 2. Shell 93 includes a pair of passages 116, 117 communicating with an interior cavity 118 defined in part by the face 113 of reaction member 92 and the face 114 of apply member 94. This interior cavity 118 is in communication with the lubricant passage 41, 42 in shaft portion 32. As shown more clearly in FIG. 4, an impact ladling member 119 extends tangentially from passage 117 into the annular cavity formed by interior surface 67 of the cylindrical portion 62 of input member 61. As input member 61 is rotated by V-belts engaging the grooves 66, a lubricating fluid in member 61 forms into an annular ring adjacent surface 67 under the influence of centrifugal force. The annular ring of rotating lubricating fluid impinges on the open end 121 of the impact ladling tube 119. Lubricating fluid is thereby forced through tube 119, passage 116, cavity 118, and passages 41, 42.

The lubricating fluid is circulated by means of impact pressure from passage 42 through tubing 24 to a heat exchanger 22 formed of tubing 122 and convection fins 123. A suitable mounting bracket 124 is provided for mounting heat exchanger 22 on a frame member. The lubricating fluid flows from heat exchanger 22, through tubing 23 and passages 45, 46, 47 to the bearings 56, 56 and clutch 80 and through passage 115 to bearing 73.

The valve 20 provides means for regulating a control pressure for control chamber 109, and is shown in section to enlarged scale in FIG. 3. Valve 20 includes a body 131 having an inlet port 132 for connection to a source of pneumatic pressure, an outlet port 133 for connection to control chamber of unit 10 and a vent port 134 which communicates with atmosphere. One end of body 131 includes a threaded portion 136 adapted to insertion into a portion of the cooling system. A thermal element 137 is secured in body 131 by the threaded portion 138. A seal ring 135 is employed to provide a fluid tight closure. Thermal element 137 includes a sensor portion 139 external of valve body 131 and a movable portion 141 extending internally thereof, said movable portion 141 being extensible in response to a temperature rise, and retractible in response to a decreasing temperature as sensed by the sensor portion.

Valve body 131 includes a supply chamber 142 defined in part by the internal cylindrical wall 143, an end portion 144 of a spacer adjacent thermal element 137, and an internal shoulder portion 146. Supply chamber 142 communicates with inlet port 132 by means of passage 147.

The remote end of body 131 includes a second internal cylindrical portion 148 having screw threads 149 formed therein. An end cap 151 is secured in the threads 149, and a seal ring 152 is employed to provide a fluid tight closure. The surface 148, end cap 151 and face 153 of balance piston 154 define a regulating chamber 156 communicating with outlet port 133 through passage 157.

Balance piston 154 includes a cylindrical surface 158 having a seal ring 159 mounted therein providing a slidable fluid tight seal with surface 148. The other face 161 of piston 154 engages one end of regulating spring 162 which has its other end bearing on surface 163 adjacent shoulder 146. Piston 154 includes a central aperture 164 defining an annular valve seat 166 in face 153 thereof. Central aperture 164 communicates with vent port 134 by means of passage 167 in piston 154 and passage 168 in body 131.

Piston 154 includes a surface 192 abuttable against the surface 163 for limiting movement of the piston in one direction. A surface 193 on end cap 151 is arranged for abutment with face 153 of piston 154 for limiting movement thereof in the other direction. An elongated hollow slidable plunger 169 has a first end portion 171 disposed in supply chamber 142, and a second end portion 172 disposed in regulating chamber 156. First end portion 171 includes a flange portion 173 and shim 175 engaged with the movable portion 141 of thermal element 137. Shim 175 is used to set or calibrate the initial pressure regulating range by determining the initial adjusted position of plunger 169. A spring 174 extends between flange portion 173 and a spring seat 176 urging plunger 169 toward engagement with movable portion 141 of thermal element 137. A passage 177 formed in first end portion 171 provides communication between supply chamber 142 and the interior 179 of plunger 169. A seal ring 178 encircles plunger 169 adjacent shoulder 146 providing a slidable fluid tight seal between plunger 169 and shoulder 146. Second end portion 172 of plunger 169 extends through the central aperture 164 of piston 154 and terminates in an end 181 defining an annular valve seat.

A pilot member 182 includes a flange portion 183 and a socket portion 184 receiving an end portion of plunger 169. Flange portion 183 carries a sealing surface 186 engageable with the annular valve seat 166 of piston 154. If desired, the sealing surface 186 may be formed of a rubber-like washer or may be in the form of a soft deformable coating to improve the sealing properties thereof. A disc 187 in socket portion 184 is engageable with end portion 181 of plunger 169 forming a second annular sealing surface. Preferably the disc 187 is formed of a deformable material to improve the sealing properties thereof. A radial passage 188 is provided in pilot member 182 between the sealing surfaces 186, 187 communicating the interior of socket portion 184 with regulating chamber 156. A seal ring 189 in pilot member 182 encircles the end portion 172 of plunger 169 between the sealing surface 186 and passage 188 to prevent leakage along the outer surface of the plunger end portion.

A return spring 191 is compressed between flange portion 183 of pilot member 182 and a portion of end cap 151 urging pilot member toward plunger 169 and piston 154.

An operating sequence of valve 20 will be described hereinafter in order to more fully set forth the cooperation of the various components thereof. While various components may be expected to undergo simultaneous movement, their operation will be described individually for simplicity. By way of example, the threaded portion 136 of valve 20 is to be inserted in a cooling system such that sensor portion 139 is exposed to a coolant therein, inlet port 132 is to be connected to a source of pneumatic pressure, and outlet port 133 is connected to apparatus requiring a regulated pressure such as control chamber 109 of fan drive 10.

Assuming that the sensed temperature is low, the movable portion 141 of thermal element 137 is retracted toward the left from the position shown in the drawing, the plunger 169 follows the movement of portion 141, and spring 162 has moved piston 154 toward the right as viewed in FIG. 3 until face 153 abuts surface 193. Under the above described condition, piston 154 has moved pilot member 182 toward the right such that valve seat 166 is closed, and valve seat 181 is open. When a source of pressure is made available to inlet port 132, the pressure is exhibited in supply chamber 142, interior 179 of plunger 169 by means of passage 177, regulating chamber 156 by means of passage 188, and outlet port 133. The pressure in regulating chamber 156 acts upon face 153 moving piston 154 toward the left, compressing regulator spring 162. Pilot member 182 follows the movement of the piston as a result of return spring 191 until valve seat 181 closes on surface 187 thereby closing passage 188 and isolating regulating chamber 156 from the supply pressure in the interior 179 of plunger 169. When valve seat 181 is closed, movement of pilot member 182 is arrested and the pressure in regulating chamber 156 becomes stabilized at a value which balances the force of regulator spring 162. The operation of the valve is such that a relatively high pressure is provided in regulating chamber 156 when sensor portion 139 is exposed to a relatively lower temperature.

As the sensed temperature increases, the movable portion 141 extends, moving plunger 169 toward the right as viewed in FIG. 3. Pilot member 182 is moved with plunger 169 thereby opening valve seat 166 permitting reduction of pressure in regulating chamber 156 by bleeding across the valve seat 166, through aperture 164, passages 167 and 168 to vent port 134. The pressure is reduced by bleeding across valve seat 166 until the force of spring 162 acting on 161 is balanced by the force of pressure on face 153 to reseat valve 166.

Thus, so long as piston 154 is free to move between the stop surfaces 163 and 193, the pressure in regulating chamber 156 is determined by the position of the plunger, the force of spring 162 and the area of face 153. Where it is desired to provide the widest range of pressure regulation, the stop surfaces 163 and 193 are arranged to permit a piston travel equal to or greater than the movement of movable thermal portion 141. On the other hand, where it is desired to limit pressure regulation to a portion of a range of the thermal element, the stop surfaces 163 and 193 are arranged to limit the movement of piston 154 accordingly. For example, when stop surface 193 is arranged to limit piston movement to less than the fully extended range of the plunger, the valve seat 166 is open, communicating regulating chamber 156 with vent port 134. The regulating chamber thus remains at vent pressure until plunger 169 has retracted sufficiently to permit seating valve 166. Further retraction of plunger 169 results in regulated increase of pressure in regulating chamber 156 until piston 154 rests against stop surface 163 after which the pressure in regulating chamber 156 becomes equal to supply pressure and remains so with further retraction of the plunger.

The operation of valve 20 in combination with variable speed fan drive 10 will now be described as applied to the cooling system of an internal combustion engine. The valve is installed to sense the temperature of the coolant, its inlet port is connected to a source of compressed air, and its outlet port is connected to the regulator chamber of the fan drive arranged to circulate a stream of air for regulating the temperature of the coolant.

Upon starting a cold engine the coolant is at low temperature resulting in a retracted condition of thermal element 137 which further results in a relatively higher pneumatic pressure in regulating chamber 156 and consequently in control chamber 109. The relatively high pressure in control chamber 109 overcomes the force of springs 96, 96 such that clutch 80 is released. With clutch 80 in the released condition, the output member 51 and fan 12 are disengaged from the input member 61 which is driven at engine speed. While fan 12 is disengaged, the coolant is allowed to heat to the desired operating temperature. As the coolant becomes warmer, the valve 20 regulates the pressure in control chamber 109 downwardly permitting springs 96, 96 to impose an increasing net engaging force on clutch 80 for operation in the slip range thereby increasing the speed of fan 12 as the temperature of the coolant increases. Thereafter, as the engine is operated under varying load conditions, increases and decreases in the engine coolant result in pressure changes in control chamber 109 which in turn vary the net engaging force on clutch 80 and therefor the speed of fan 12.

The hereinbefore described drive and control means therefor provide a fail safe stepless variable speed drive regulated in accordance with temperature which is especially desirable for fan drives of a motor vehicle such as an earth moving machine or highway truck where it is desired to avoid vibration and power surges. In operation, the drive often runs at less than engine speed which results in a corresponding reduction in noise. The load cell provides for fail safe operation in that if a loss of air pressure should occur, the spring fully engages the clutch to provide cooling.

What is claimed is:

1. A thermally responsive pneumatic pressure regulating valve for providing a regulated pressure head inversely proportional to a temperature signal, said valve having a body including a supply chamber and a regulating chamber spaced from each other, an inlet port communicating with said supply chamber adapted for connection to a source of fluid pressure, an outlet port communicating with said regulating chamber adapted for connection to control apparatus, and a vent port spaced from said outlet port;

a temperature sensor mounted in said body having a portion extending externally thereof in communication with said temperature signal and including a movable portion disposed within said supply chamber, said movable portion being adapted for extensile movement in response to temperature rise;

an annular balance piston slidably mounted within said body between said outlet port and said vent port including a central aperture, one face of said piston being adjacent said outlet port defining one end of said regulating chamber, said one piston face including a first annular valve seat surrounding said central aperture;

a regulating spring disposed between an opposite face of said piston adjacent said vent port and a shoulder formed in said body adjacent said supply chamber, said regulating spring biasing said piston against the force of a regulated pressure in said regulating chamber;

an elongated hollow slideable plunger mounted in said body extending through the central apertured portion of said piston, said plunger having a first end portion thereof disposed within said supply chamber engageable with said movable portion of said temperature sensor, said first end portion including a passage communicating the interior of said plunger with said supply chamber, said plunger having a second end portion thereof disposed within said regulating chamber including a second annular valve seat defined thereon; and a movable pilot member disposed in said regulating chamber having a flange portion including a first annular sealing surface adapted for engagement with said first annular valve seat of said piston and having a socket portion including a second annular sealing surface adapted for engagement with said second annular valve seat of said plunger, said pilot member being resiliently urged toward sealing engagement with said piston, being movable out of engagement with said first annular valve seat in response to extensile movement of said plunger for bleeding pressure fluid from said regulating chamber through said central aperture of said piston member, said second sealing surface being separated from said second valve seat in response to retractile movement of said plunger for admitting pressure fluid to said regulating chamber.

* * * * *